(12) United States Patent
Khmelev et al.

(10) Patent No.: US 11,410,416 B1
(45) Date of Patent: Aug. 9, 2022

(54) SYSTEMS AND METHODS FOR ASSESSING LANDSCAPE CONDITION

(71) Applicant: United Services Automobile Association (USAA), San Antonio, TX (US)

(72) Inventors: Yevgeniy Viatcheslavovich Khmelev, San Antonio, TX (US); Oscar Guerra, San Antonio, TX (US); Jeffrey Neal Pollack, San Antonio, TX (US); Janelle Denice Dziuk, Falls City, TX (US); Ashley Raine Philbrick, San Antonio, TX (US); Ryan Thomas Russell, San Antonio, TX (US); David Patrick Dixon, Boerne, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 16/859,245

(22) Filed: Apr. 27, 2020

Related U.S. Application Data

(60) Provisional application No. 62/840,961, filed on Apr. 30, 2019.

(51) Int. Cl.
  *G06V 20/13* (2022.01)
  *G06V 20/10* (2022.01)
  *H04N 7/18* (2006.01)
  *G05B 19/042* (2006.01)

(52) U.S. Cl.
  CPC .......... *G06V 20/13* (2022.01); *G05B 19/042* (2013.01); *G06V 20/10* (2022.01); *H04N 7/181* (2013.01); *G05B 2219/23158* (2013.01)

(58) Field of Classification Search
  CPC .. G06K 9/0063; G06K 9/00664; G06V 20/10; G06V 20/13; G06V 20/17
  See application file for complete search history.

(56) References Cited

U.S. PATENT DOCUMENTS

| | | | | |
|---|---|---|---|---|
| 6,964,379 | B2 * | 11/2005 | Crowley | A62C 37/09 239/208 |
| 9,823,658 | B1 * | 11/2017 | Loveland | G06K 9/2063 |
| 9,870,448 | B1 * | 1/2018 | Myers | A61B 34/10 |
| 9,875,509 | B1 * | 1/2018 | Harvey | G06T 17/20 |
| 9,977,963 | B1 * | 5/2018 | Fendell | G05D 1/0011 |
| 10,102,589 | B1 * | 10/2018 | Tofte | H04N 7/185 |
| 10,134,092 | B1 * | 11/2018 | Harvey | G06K 9/6201 |
| 10,137,984 | B1 * | 11/2018 | Flick | G08G 5/006 |
| 10,354,386 | B1 * | 7/2019 | Farnsworth | G06T 7/0085 |
| 10,514,669 | B1 * | 12/2019 | Call | G06Q 50/16 |
| 10,755,357 | B1 * | 8/2020 | Davis | G06K 9/00637 |
| 10,997,663 | B1 * | 5/2021 | Wyatt | G06Q 40/08 |
| 2002/0026431 | A1 * | 2/2002 | Pedersen | G08B 17/125 706/1 |
| 2006/0008137 | A1 * | 1/2006 | Nagahdaripour | G06K 9/0063 382/154 |

(Continued)

*Primary Examiner* — Michael Robert Cammarata
(74) *Attorney, Agent, or Firm* — Fletcher Yoder PC

(57) ABSTRACT

A technique for assessing a landscape condition of a property is provided that determines landscape condition for an individual property or properties of interest using image data from one or more unmanned aerial vehicles. Based on the image data, a control system may generate a landscape condition output, such as an alert for a property owner or control signals for damage mitigation devices.

5 Claims, 5 Drawing Sheets

(56) References Cited

U.S. PATENT DOCUMENTS

| | | | |
|---|---|---|---|
| 2008/0114655 A1* | 5/2008 | Skidmore | G06Q 10/10 705/14.36 |
| 2009/0265193 A1* | 10/2009 | Collins | G06Q 30/0185 705/4 |
| 2010/0070097 A1* | 3/2010 | Morgenstern | A62C 37/40 700/284 |
| 2014/0245210 A1* | 8/2014 | Battcher | G01S 13/95 715/771 |
| 2015/0317740 A1* | 11/2015 | Emison | G06Q 40/08 705/4 |
| 2015/0339913 A1* | 11/2015 | Lyman | G08B 5/38 340/287 |
| 2016/0048925 A1* | 2/2016 | Emison | G06K 9/52 705/4 |
| 2016/0059059 A1* | 3/2016 | Xin | A62C 37/44 169/46 |
| 2016/0175633 A1* | 6/2016 | Smith | A62C 3/0214 169/61 |
| 2017/0103633 A1* | 4/2017 | Khire | A62C 37/40 |
| 2017/0301109 A1* | 10/2017 | Chan | G06T 7/73 |
| 2017/0301220 A1* | 10/2017 | Jarrell | H04W 4/38 |
| 2018/0190132 A1* | 7/2018 | Cronkhite | G06K 9/0063 |
| 2018/0239948 A1* | 8/2018 | Rutschman | G06T 7/20 |
| 2018/0239982 A1* | 8/2018 | Rutschman | H04N 5/23299 |
| 2019/0051046 A1* | 2/2019 | Jin | G08G 5/045 |
| 2019/0102623 A1* | 4/2019 | Flood | B64C 39/024 |
| 2019/0176987 A1* | 6/2019 | Beecham | B64C 39/024 |
| 2020/0143212 A1* | 5/2020 | Okazaki | G06T 7/00 |
| 2020/0198122 A1* | 6/2020 | Newman | B25J 9/1697 |
| 2021/0042843 A1* | 2/2021 | Bryant | G06Q 10/10 |

\* cited by examiner

SYSTEMS AND METHODS FOR ASSESSING LANDSCAPE CONDITION

CROSS-REFERENCE TO RELATED APPLICATION

The present disclosure is related to, and claims priority to, U.S. Provisional Patent Application Ser. No. 62/840,961, titled "Systems and Methods for Assessing Landscape Condition," which was filed on Apr. 30, 2019, and which is herein incorporated by reference in its entirety for all purposes.

BACKGROUND

The present disclosure relates generally to systems and methods for assessing landscape condition of a geographic region of a property. More specifically, the present disclosure relates to techniques to provide an assessment of landscape features and characteristics of the landscape features of a geographic region of a property and to assemble a landscape condition output.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural disasters can produce damage to a property that may be expensive and time-consuming to repair for the property owner and/or manager. At least in some instances, certain landscape features around the property, both natural landscape features (e.g., plants, water sources, hills) and artificial landscape features (e.g., swimming pools, structures), that can either reduce or increase a likelihood of damage to the property from a natural disaster, such as a wildfire. However, it may be difficult for a person associated with the property to monitor and/or manage these landscape features to mitigate or prevent damage to the property. It is now recognized that there is a need for improving the assessment of a landscape condition and the management of the property prior to and/or during a natural disaster.

SUMMARY OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system having a processor. The system also includes a tangible, non-transitory, computer readable medium, comprising instructions. The instructions cause the processor to receive an indication indicative of a possible source of damage, associated with a natural disaster, to a property in a geographic area. The instructions also cause the processor to instruct an imaging device to obtain first image data of the property in the geographic area at a first time point. Additionally, the instructions cause the processor to receive the image data of the property. Further, the instructions cause the processor to identify a landscape condition of the property based on the image data. Further still, the instructions cause the processor to generate a landscape condition output based on the landscape condition. Even further, the instructions cause the processor to provide the landscape condition output to a computing device associated with a property owner of property.

In another embodiment, the present disclosure relates to a method. The method includes receiving, via a processor, an indication indicative of a possible source of damage, associated with a natural disaster, to a property in a geographic area. The method also includes instructing, via the processor, a controller of an unmanned aerial vehicle to obtain first image data of the property via a flight path in the geographic area at a first time point. Additionally, the method includes receiving, via the processor, the image data of the property from the unmanned aerial vehicle. Further, the method includes identifying, via the processor, a landscape condition of the property based on the image data. Further still, the method includes generating, via the processor, a landscape condition output based on the landscape condition. Even further, the method includes transmitting, via the processor, the landscape condition output to one or more damage mitigation devices causing the one or more damage mitigation devices to activate based on the landscape condition output.

In another embodiment, the present disclosure relates to a system. The system includes one or more unmanned aerial vehicles. The system also includes one or more damage mitigation devices. Additionally, the system includes a control system communicatively coupled to the one or more unmanned aerial vehicles and the one or more mitigation device. The control system is configured to receive an indication indicative of a possible source of damage, associated with a wildfire, to a property in a geographic area. The control system is also configured to instruct a controller of at least one unmanned aerial vehicle of the one or more unmanned aerial vehicles to obtain first image data of the property via a flight path in the geographic area based on the indication. Additionally, the control system is configured to receive the image data of the property from the unmanned aerial vehicle. Further, the control system is configured to identify a landscape condition of the property based on the image data. Further still, the control system is configured to generate a landscape condition output based on the landscape condition. Even further, the control system is configured to instruct the one or more damage mitigation devices to activate and block damage to the property based on the landscape condition output.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a property may include certain landscape features, both natural landscape features (e.g., plants, water sources, hills) and artificial landscape features (e.g., swimming pools, structures), that can either reduce or increase a likelihood of damage to the property from a natural disaster, such as a wildfire. While certain landscape features (e.g., trees, dry and dead areas of a lawn) may generally increase a likelihood of damage to the property, the characteristics of the landscape features (e.g., a distance from the property, an amount of foliage, and the like) may be adjustable or removable (e.g., via yard maintenance), which may reduce the likelihood of damage to the property. Assessing characteristics of landscape features is a time-consuming process. Further, as the occurrence of a natural disaster is unpredictable, it can be burdensome to monitor and adjust certain characteristics of the landscape features when the natural disaster is approaching the property. Accordingly, the present disclosure is directed to a landscape assessment system that does not require an in-person inspection and can provide rapid damage mitigation responses.

Figure 1:
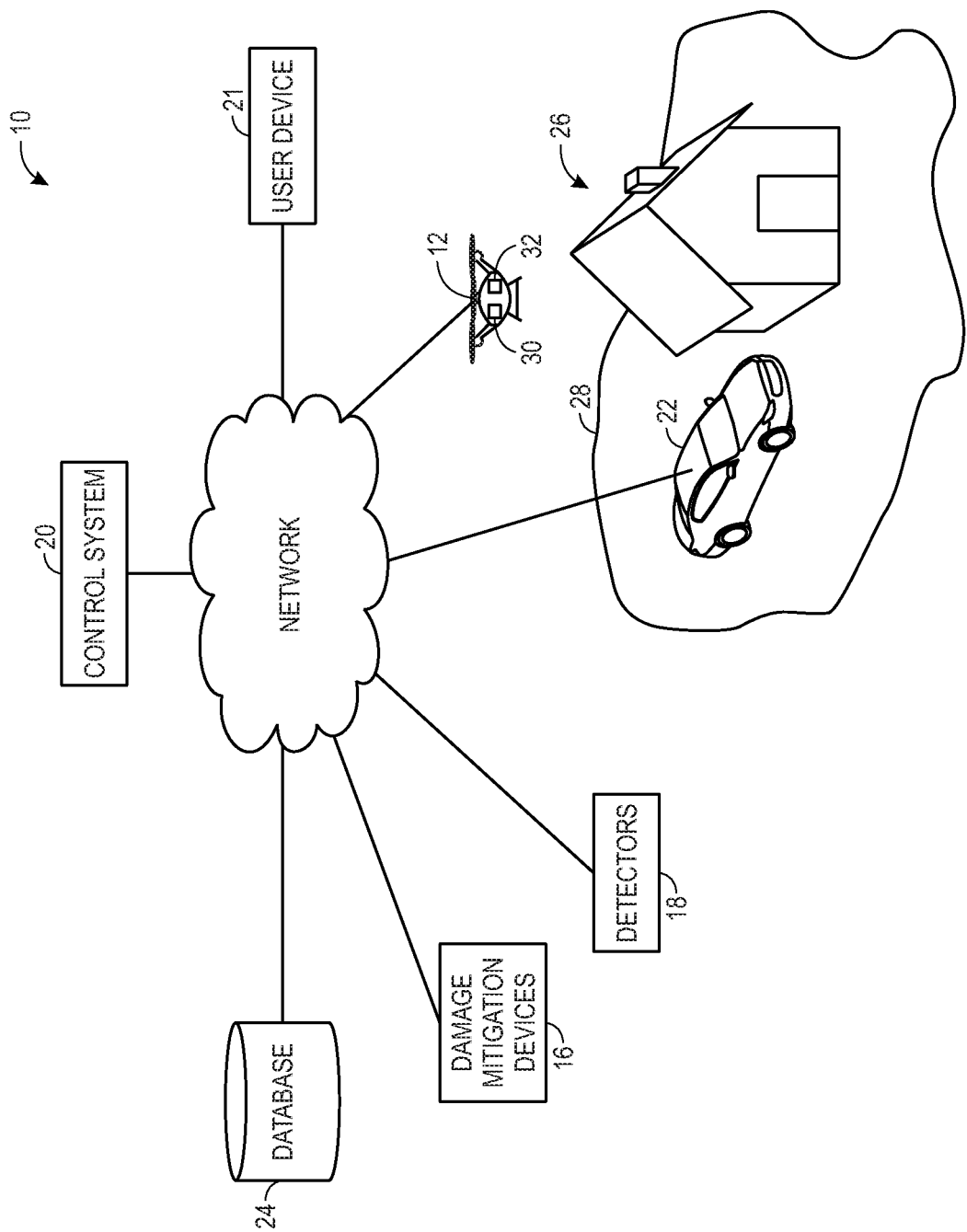
FIG. 1 illustrates a schematic diagram of a property condition assessment system, in accordance with embodiments described herein.

FIG. 1 is a block diagram of a landscape assessment system 10 that includes an unmanned aerial vehicle (UAV) 12, one or more databases 14, damage mitigation device 16, detectors 18, a user device 21, a user's vehicle 22, and a control system 20. In general, the control system 20 may instruct the UAV 12 to acquire image data related to a property 26 and a geographical area 28 in which the property 26 is location. Based on the acquired image data, the control system 20 may generate a landscape condition output such as notification for the user device 21 associated with a property owner of a likelihood of damage associated with a natural disaster, a modified risk profile associated with the owner of the property 26 based on the property owner's maintenance of the geographic area 28 which includes the property 26, and/or an instruction to a controller of the damage mitigation devices 16 to activate, which may decrease the likelihood of damage to the property 26. In some embodiments, the user of the system 10 may be a property owner or an individual or organization associated with the property 26 such as a service business (e.g., lawn care) or an insurance organization.

As shown in the illustrated embodiment of the landscape assessment system 10, the UAV 12 includes one or more on-board sensors 30 and a controller 32. Such sensors 30 may include one or more of a camera, an optical sensor, a microphone, a pressure sensor, or a temperature sensor. In operation, the UAV 12, operating under instructions executed by the controller 32, may execute a flight path over a property 26 of interest to acquire the data (e.g., a property owned by the user or another property not owned by the user). The flight path may be bounded by or based on a geographic area 28 in which the property 26 is located. That is, a user input may provide an address or geographic information for the property, and the UAV 12 may execute a flight path based on the geographic information. In some embodiments, flight by the UAV 12 may be controlled by a user, such as the property owner. In some embodiments, an autonomous or controlled land vehicle as well as a submersible vehicle may perform the operations of the UAV 12. For example, a remotely operated or autonomous submersible vehicles may be utilized after, during, or before a storm surge or hurricane to inspect boat hulls, docks/structures/derricks, or natural undersea structure such as coral reefs.

Once the property 26 of interest has been identified, the UAV 12 or other UAVs 12 in a fleet may conduct flight paths over the property 26 to monitor landscape conditions. For example, monitoring the landscape conditions may include acquiring image data of the geographic area 28 around the property 26 and identifying landscape features and characteristics associated with the landscape features based on the image data. As discussed herein, the control system 20 may generate a landscape condition output based on the identified landscape features and characteristics of the landscape features. Further, the control system 20 and/or UAV 12 may also acquire local weather condition data as input to generate the landscape condition output. For example, the local weather condition may include a location of a fire and an expected rate and direction of travel of the fire.

In one example, the control system 20 may send a control signal to a UAV 12 to monitor the geographic area 28. The control system 20 may identify a swimming pool that is within the geographic area 28 based on the acquired image data by the sensor 30 of the UAV. In some embodiments, the control system 20 may use object-based image analysis techniques to identify landscape features, such as the swimming pool. Additionally, the control system 20 may compare identified objects (e.g., landscape features) to images of pools stored in the database 24. In some embodiments, the databases 14 may include location data (e.g., GPS coordinates) that may be used to identify the location of the swimming pool relative to other landscape features and/or the property 26. In any case, the control system 20 may identify characteristics of the swimming pool such as a presence or absence of water in the swimming pool, a height of water in the swimming pool, a distance between the property 26 and the swimming pool, and a location of the swimming pool relative to a projected path of a fire. In some embodiments, the control system 20 may compare the image data acquired by the sensor 30 to a baseline or previous image of the property 26 to identify changes (e.g., new or missing landscape features and/or a change in landscape feature characteristics) relative to the baseline or previous image.

The damage mitigation devices 16 may include any device that may be used to reduce a likelihood of damage to a property 26 resulting from a natural disaster, such as a fire. For example, the damage mitigation devices 16 may include sprinklers, flooding devices, window shutters, garage door openers, and other devices that may isolate certain spaces from the effects of the natural disaster and/or may emit non-flammable substances to quench fires (e.g., gases like carbon dioxide; dry chemical and dry powders such as bicarbonates; fire suppressing foams such as aqueous film-forming foams (AFFF), film-forming fluoroproteins (FFFP), and the like).

In certain embodiments, the system may include or receive data from one or more detectors 18 that may generate, acquire, and/or receive data (e.g., image data, temperature data), such as cameras and video recording devices. Additionally, the detectors 18 may include temperature sensors. In general, the detectors 18 are devices that acquire data that may be used for processes performed by the control system 20. For example, the control system 20 may use temperature data acquired by a detector 18 that is a temperature sensor to determine a proximity of a fire to the property 26. In one embodiment, the one or more detectors may be smoke detectors or carbon monoxide detectors of the property 26. However, in other embodiments, property information may be acquired from the sensor/s 30 of the UAV. In some embodiments, the detectors 18 may include imaging devices such as RADAR/LIDAR, smart cameras, satellite imagery that may generate image data surrounding the property 26. It should be noted that the image data generated by the detectors 18 may be used in addition to or as an alternative to the image data generated by the UAVs 12.

Figure 2:
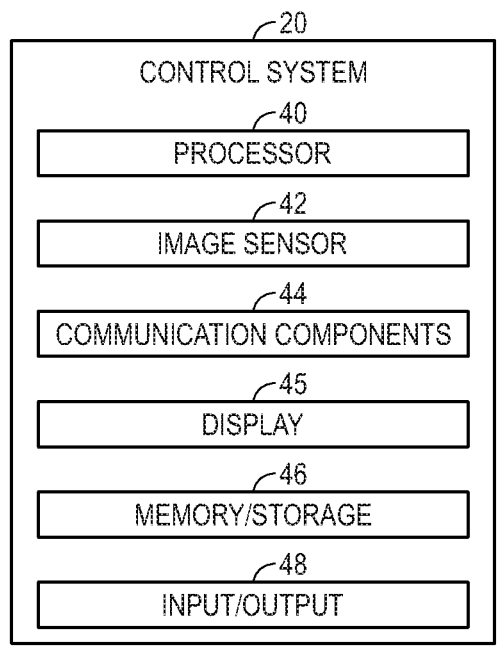
FIG. 2 illustrates a block diagram of a computing system that may be used in conjunction with the system of FIG. 1, in accordance with embodiments described herein.

To perform one or more operations described herein, the control system 20 may include various types of components that may assist the control system 20 in performing the operations described below. For example, as shown in FIG. 2, the control system 20 may include a processor 40, one or more image sensors 42, a communication component 44, a display 45, memory/storage 46, an input/output (I/O) port 48, and the like.

The processor 40 may be any type of computer processor or microprocessor capable of executing computer-executable code. The processor 40 may also include multiple processors that may perform the operations described below. The image sensor 42 may be a sensor capable of acquiring image data surrounding (e.g., environment) the control system 20. As such, the image sensor 42 may be a camera or other suitable image capturing device (e.g., scanner).

The communication component 44 may be a wireless or wired communication component that may facilitate communication between the control system 20, the databases 14, and various other computing systems via the network 17, the Internet, or the like. The display 45 may depict image data acquired by the image sensor 42 and visualizations associated with software or executable code being processed by the processor 40. In one embodiment, the display 45 may be a touch display capable of receiving inputs from a user of the control system 20. The display 45 may be any suitable type of display, such as a liquid crystal display (LCD), plasma display, or an organic light emitting diode (OLED) display, for example. Additionally, in one embodiment, the display 45 may be provided in conjunction with a touch-sensitive mechanism (e.g., a touch screen) that may function as part of a control interface for the control system 20.

The memory and the storage 46 may be any suitable articles of manufacture that can serve as media to store processor-executable code, data, or the like. These articles of manufacture may represent computer-readable media (e.g., any suitable form of memory or storage) that may store the processor-executable code used by the processor 40 to perform the presently disclosed techniques. As used herein, applications may include any suitable computer software or program that may be installed onto the control system 20 and executed by the processor 40. The memory and the storage 46 may represent non-transitory computer-readable media (e.g., any suitable form of memory or storage) that may store the processor-executable code used by the processor 40 to perform various techniques described herein. It should be noted that non-transitory merely indicates that the media is tangible and not a signal. The I/O ports 48 may be interfaces that may couple to other peripheral components such as input devices (e.g., keyboard, mouse), the detectors 18, input/output (I/O) modules, and the like.

In addition to the control system 20, the user device 21, as well as other suitable computing devices described herein may include the components described above for the control system 20. It should be noted that the components described above with regard to the control system 20 are exemplary components and the control system 20 may include additional or fewer components than shown.

The system 10 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Included in the system is a user device 21 from which the initial query regarding property landscape condition may be generated. The user device may be a general-purpose personal computer, a laptop computer, a tablet computer, a mobile computer, a mobile device (e.g., cell phone), etc. The control system 20 may be in communication with the user device 21 and configured to receive the initial query via an interface of the user device 21.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

It should be noted that the components described above with regard to the control system 20 are exemplary components and the control system 20 may include additional or fewer components as shown.

The control system 20 may communicate with one or more UAVs 12 that acquire property data (e.g., image data). In certain embodiments, the control system 20 communicates with a UAV control system that in turn provides instructions to one or more UAVs 12. Such communication may include property information (e.g., GPS coordinates associated with object, landscape features, and/or boundaries of the property 26, topographic maps, and other information may be used to determine areas of the property 26 for the UAVs 12 to monitor) that causes one or more UAVs 12 to execute a flight path over the property 26 under control of the controller 15. The controller 15 may also activate the one or more detectors 18 to acquire property data based on the location of the UAV 12 (e.g., when positioned over the property 26). In one embodiment, the UAV 12 performs a series of scheduled flight paths (e.g., daily, weekly) and provides the acquired property data to the control system 20 for analysis of property condition. In another embodiment, the UAV 12 acquires general data of a particular geographic area and, upon receipt of property information, provides historic data of the property to the control system 20.

Figure 3:
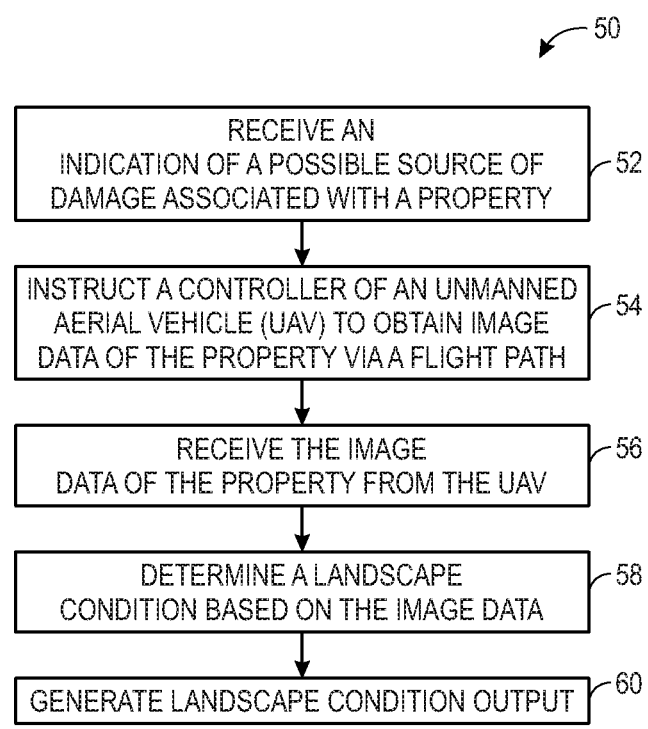
FIG. 3 illustrates a flow diagram for assessing a landscape condition, in accordance with embodiments described herein.

FIG. 3 illustrates an example process 50 that may be employed by the control system 20 to generate a landscape condition output. Before proceeding, it should be noted that the process 50 described below is described as being performed by the control system 20, but the process 50 may be performed by other suitable computing devices.

Referring now to FIG. 3, at block 52, the control system 20 may receive an indication of a presence of a possible source of damage associated with a property. For example, as discussed above, the control system 20 may receive a local weather condition that includes a location of a fire and an expected rate and direction of travel of the fire. In other embodiments, the indication may be a hurricane or storm watch or warning for a geographic area that includes the property. In some embodiments, receiving the local weather condition may include the control system 20 determining a likelihood or risk of the fire reaching and/or damaging the property 26. In some embodiments, the indication may be a request by the property owner or an organization associated with (e.g., owning, living, and/or managing) the property 26 (e.g., an insurance company) to determine a likelihood of damage to the property in the event of the possible source of damage, such as a fire. For example, the request may be provided by user device 21. In other embodiments, the indication may be based on a signal from one or more detectors 18 of the property 26. Further, while the process 50 may be triggered by a potential natural disaster, it should be understood that the process 50 may also be initiated as part of a property assessment in the absence of a known or oncoming natural disaster. For example, a property owner or manager may request a periodic fire risk assessment.

At block 54, the control system 20 may instruct the controller 32 of an unmanned aerial vehicle (UAV) 12 to obtain image data of the property via a flight path. In some embodiments, the control system 20 may instruct respective controllers of multiple UAVs 12 to obtain image data of the property 26 via respective flight paths. In some embodiments, the control system 20 may instruct the UAV 12 to acquire image data of properties near the property 26, which may also be used be used to determine a likelihood of damage to the property 26. That is, a tree or landscape features on a neighboring property may increase a likelihood of damage to the property 26 for certain types of disaster events.

In some embodiments, the control system 20 may instruct the detectors 18 to obtain image data of the property in addition to the image data obtained by the UAV 12, or as an alternative. For example, the control system 20 may obtain satellite image from a satellite or from the one or more smart cameras (e.g., detectors 18) disposed around the property 26 in response to receiving the indication of the possible source of damage associated with the property 26, as discussed with regard to process block 52.

At block 56, the control system 20 may receive image data of the property from UAV 12. In some embodiments, the control system 20 may store the image data and time data that indicates when the image was acquired, such that the stored image data may be used for comparisons with image data as discussed herein.

At block 58, the control system 20 may determine a landscape condition of the property based on the image data. In some embodiments, determining the landscape condition comprises identifying the presence of landscape features in the geographic area 28 which includes the property 26. As discussed above, the control system 20 may determine the landscape condition of the property based on object-based image analysis, e.g., comparison of the image data acquired by the UAV(s) to image data stored in the database 24, using a neural net trained on common landscape features. In some embodiments, the control system determines one or more characteristics of the landscape features identified in the image data. For example, the characteristics may include whether trees around the property 26 are alive based on identification of leaves and/or an overall color of the trees, whether the trees have branches that extend some distance over the property 26 or flammable materials present around the property, a height at which the foliage begins on the tree, whether and the extent at which the trees and/or property 26 are uphill from flammable substances (e.g., other trees), a distance of trees from the property 26, and the like. In some embodiments, determining the landscape condition of the property 26 may include generating a risk or a numerical, alphabetical, or otherwise representation of a likelihood of the property 26 being damaged by a fire. For example, trees that are green and thriving may be considered to be a lower risk than trees that are dead. In addition, trees with a lower start of foliage height may be considered to be a higher risk than trees with a higher foliage start and that are relatively bare near the ground. In addition, the control system 20 may be configured to identify landscape features by plant type (e.g., genus and species of plant, or a general descriptor such as "tree" or "bush") based on certain factors (e.g., geographic location of the landscape feature, climate of the geographic location of the landscape feature, leaf shape, bark shape, current season, and the like) to determine whether the property has a higher-than-desirable number of more flammable plants (e.g., Eucalyptus trees) or, in contrast, has a number of plants that are characterized as fire-resistant. These and other factors may be weighted to generate the overall risk score.

For example, the control system 20 may determine that a landscape feature is a tree with a first confidence interval, that the tree is in the oak family at a second confidence interval, and that the tree is alive with a third confidence interval based on weighting certain factors (e.g., 75% based on geographic location and 25% based on leaf shape). As such, the control system 20 may assign a risk score associated with the tree. As another non-limiting example, an identified Eucalyptus tree may contribute negatively to the risk score due to the oils present in the tree.

At block 60, the control system 20 may generate a landscape condition output. In some embodiments, the landscape condition output may be a control signal or activation signal that may cause a damage mitigation device 16 to operate. For example, the control signal may cause a window shutter to close to protect the windows of a home from the fire or may trigger activation of sprinklers when the risk of the property 26 being damaged by the fire exceeds a threshold. In some embodiments, the landscape condition output may be a risk score outputted to the user device 21 and/or computing devices of individuals and/or organizations associated with the property 26. In some embodiments, the landscape condition output is an alert. For example, the alert may warn a property owner via the user device 21 that damage from a fire is likely when the risk exceeds a threshold. Additionally, or alternatively, the alert may indicate that certain landscape features need maintenance, such as a pool needing more water or trees needing to be trimmed. It should be noted that the alert maybe provided to a user device 21 associated with a service person. That is, the landscape condition output may result in hiring or alerting a service person to perform certain types of maintenance.

Although described in a particular order, which represents a particular embodiment, it should be noted that the process 50 may be performed in any suitable order. Additionally, embodiments of the process 50 may omit process blocks and/or include additional process blocks. Moreover, in some embodiments, the process 50 may be implemented at least in part by executing instructions stored in a tangible, non-transitory, computer-readable medium, such as memory implemented in a data processing system, using processing circuitry, such as a processor 40 implemented in the control system 20.

Figure 4:
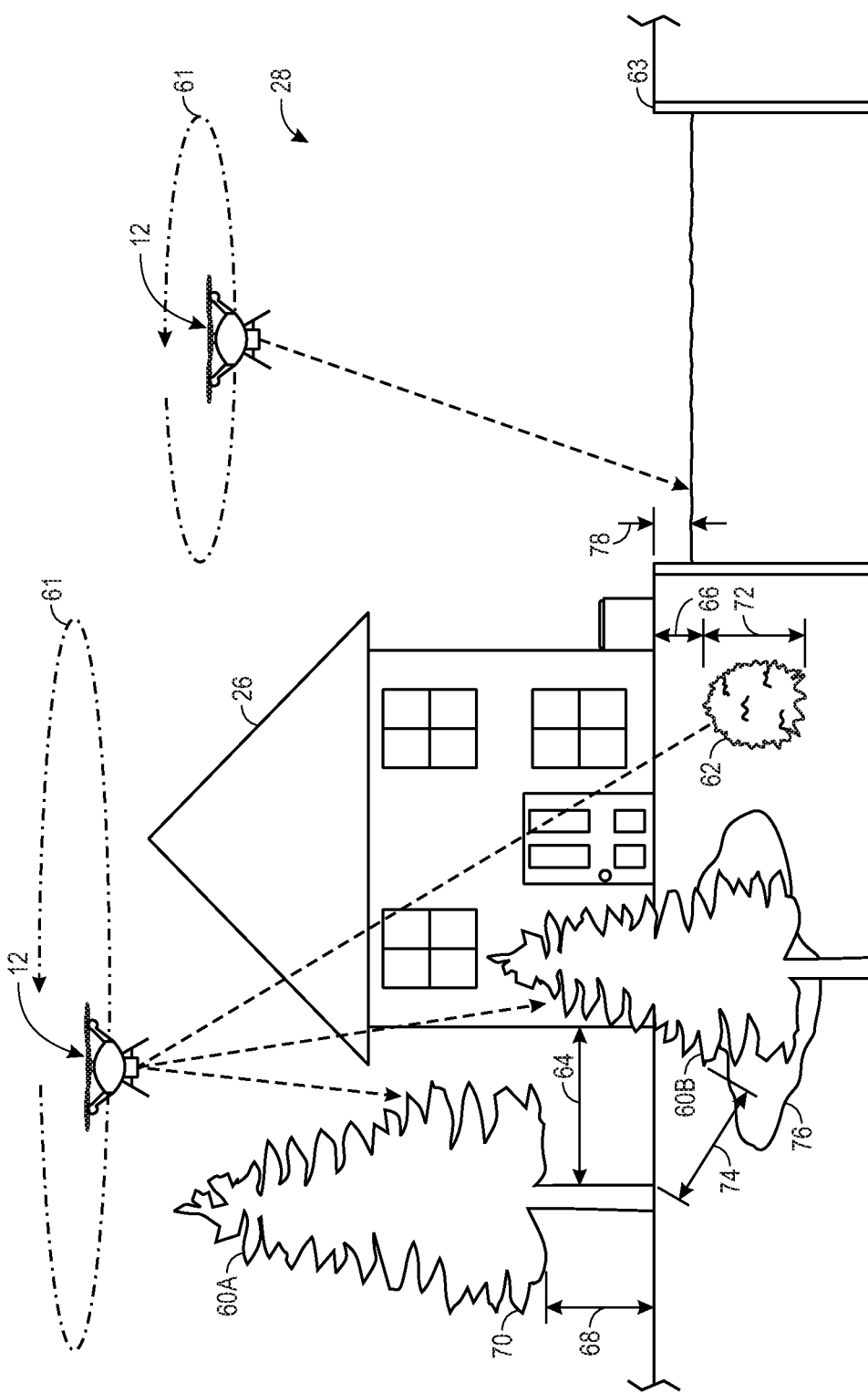
FIG. 4 illustrates one or more unmanned aerial vehicles acquiring image data of a geographic area around a property, in accordance with embodiments described herein.

To illustrate certain aspects of the present disclosure, FIG. 4 shows an example of UAVs 12 monitoring certain landscape characteristics of a geographic area 28 surrounding a property 26. As shown in the illustrated embodiment in FIG. 4, the geographic area 28 includes landscape features such as trees 60a and 60b, a plant 62, a swimming pool 63. As such, the UAVs 12 on respective flight paths 61, may acquire image data of the geographic area 28, which may be sent to the control system 20. The control system 20 may identify a distance 64 between the tree 60a and the property, a distance 66 between the plant and the property 26, a height 68 up the tree where the foliage 70 begins, and a height 72 of landscape features such as the plant 62, a distance 74 between the trees 60a and 60b. Additionally, the control system 20 may identify a size and location of the dry patch 76 on the geographic area 28, the distance 78 of water from the top of the swimming pool 63. In some embodiments, as shown in the illustrated embodiment in FIG. 4, the UAVs may be tethered via a cable 80 to a power supply 82, such that the UAV 12 may monitor the geographical regions for longer times.

Figure 5:
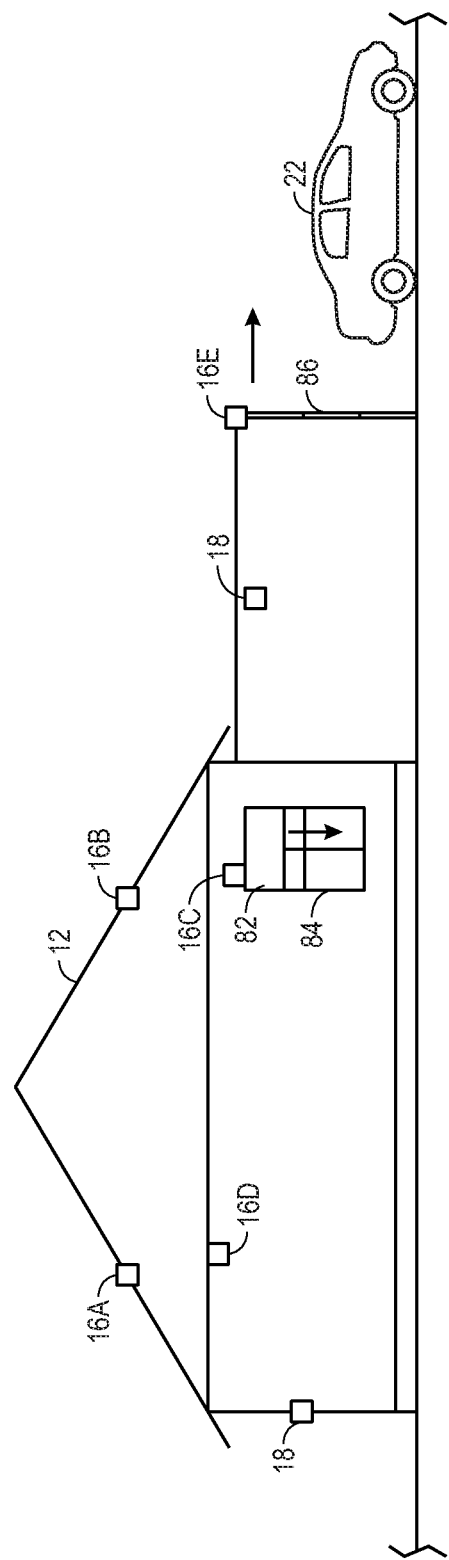
FIG. 5 illustrates damage mitigation devices that may be disposed on or within a property, in accordance with embodiments described herein.

To illustrate certain aspects of the present disclosure, FIG. 5 shows an example of a property 26 including damage mitigation devices 16 and detectors 18. As shown in FIG. 5, the damage mitigation devices 16 and detectors 18 may be disposed in various locations in and outside of the property. For example, damage mitigation devices 16a and 16b are disposed on the roof of the property 26, damage mitigation device 16d is disposed on an interior of the property 26. The damage mitigation devices 16a, 16b, and 16d may emit non-flammable substances onto the roof of the property 26 to quench fires and/or provide fire resistance when the control system 20 determines that the likelihood of a fire causing damage to the property 26 is above a threshold. Damage mitigation device 16c is an actuator that may cause a shutter 82 (e.g., roller shutters) to cover the window 84, and thus, protect the interior of the property 26 from fire damage or prevent the fire from spreading to different areas of the property 26.

Additionally, FIG. 5 includes a damage mitigation device 16e that is coupled to a garage door 86 of the property 26. In operation, the damage mitigation device 16e may open or close the garage door 86 based on control signals received from the control system 20. For example, the damage mitigation device 16e may cause the garage door 86 to open so that either a property owner or the control system 20 may cause the vehicle 22 to exit the property. That is, the control system may also be configured to control the vehicle.

Figure 6B:
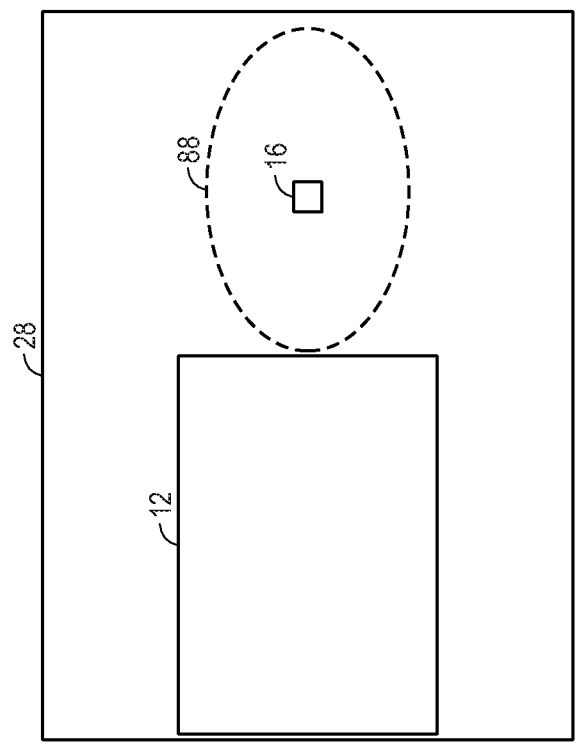
FIG. 6B illustrates the damage mitigation device of FIG. 6A that has activated based on a control signal from a control system, in accordance with embodiments described herein.
Figure 6A:
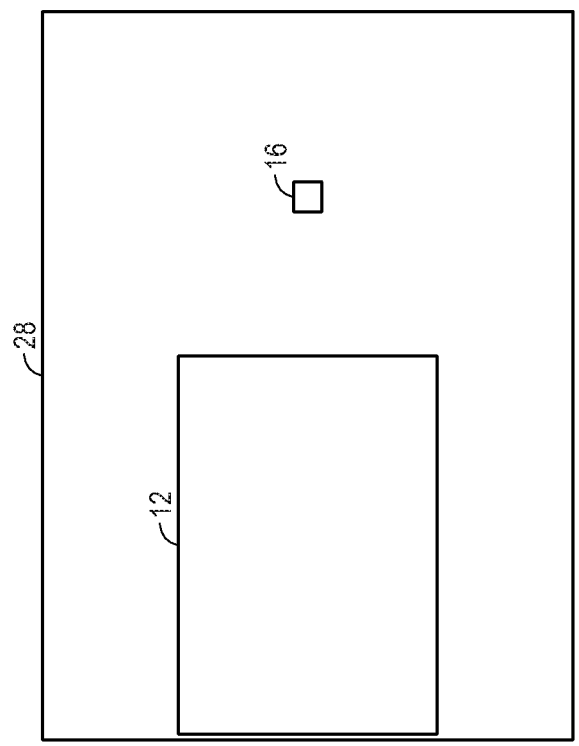
FIG. 6A illustrates a damage mitigation device that may be disposed within the geographic area, in accordance with embodiments described herein.

To further illustrate certain aspects of the present disclosure, FIG. 6A shows an illustration of a top-down view of a property at a first time point prior to activation of a damage mitigation device 16, which is a water emitting device that may flood an area of the geographic area 28. FIG. 6B shows an image of the property 26 at a second time point after the damage mitigation device 16 has emitted water, and thus, formed a flooded region 88 in the geographic area 28.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
   receiving, via a processor, a weather alert associated with a natural disaster for a geographic area;
   determining, via the processor, the geographic area of the weather alert is associated with a property;
   instructing, via the processor, a controller of an unmanned aerial vehicle to obtain first image data of the property via a flight path in the geographic area at a first time point in response to determining the geographic area is associated with the property;
   receiving, via the processor, the image data of the property from the unmanned aerial vehicle;
   identifying, via the processor, a risk-mitigating landscape feature of the property based on the image data;
   determining, via the processor, a characteristic of the risk-mitigating landscape feature, wherein the characteristic of the risk-mitigating landscape feature is that a previously identified risk-mitigating landscape feature is absent from the property;
   generating, via the processor, a landscape condition output based on the characteristic of the risk-mitigating landscape feature; and
   transmitting, via the processor, the landscape condition output to a garage door controller of the property wherein, upon receipt of the landscape condition output, the garage door operates to close an open garage door.

2. The method of claim 1, comprising transmitting the landscape condition output to a water emitting device proximate to or within the property, wherein, upon receipt of the landscape condition output, the water emitting device operates to emit water.

3. The method of claim 1, wherein the natural disaster is a wildfire, and the weather alert comprises a wind direction, and wherein determining the geographic area is associated with the property comprises determining the property is downwind of the wind direction.

4. The method of claim 1, wherein the characteristic of the risk-mitigating landscape feature comprises a relative position of the risk-mitigating landscape feature to a structure of the property.

5. The method of claim 1, wherein the risk-mitigating landscape feature comprises an artificial landscape feature.

\* \* \* \* \*